March 15, 1955

F. J. COZZOLI 2,704,147

RECTANGULAR-CYCLE GROUP-HANDLING
CONVEYOR FOR AMPUL PROCESSING

Filed May 27, 1952

INVENTOR.
Frank J. Cozzoli

Harold F. Scribner
ATTORNEY

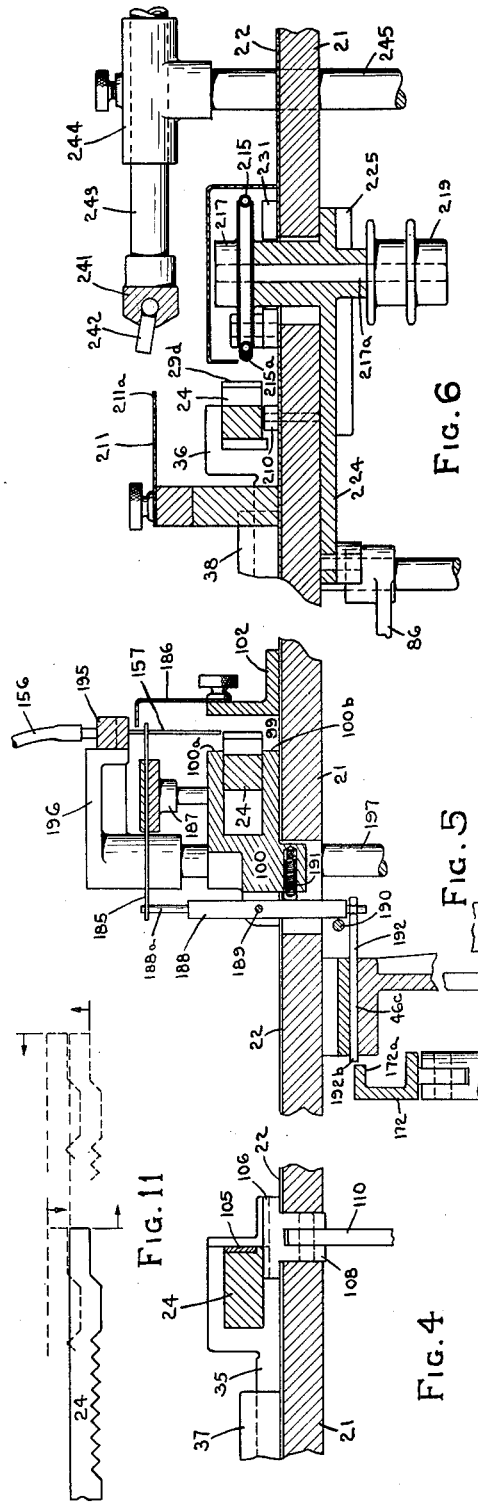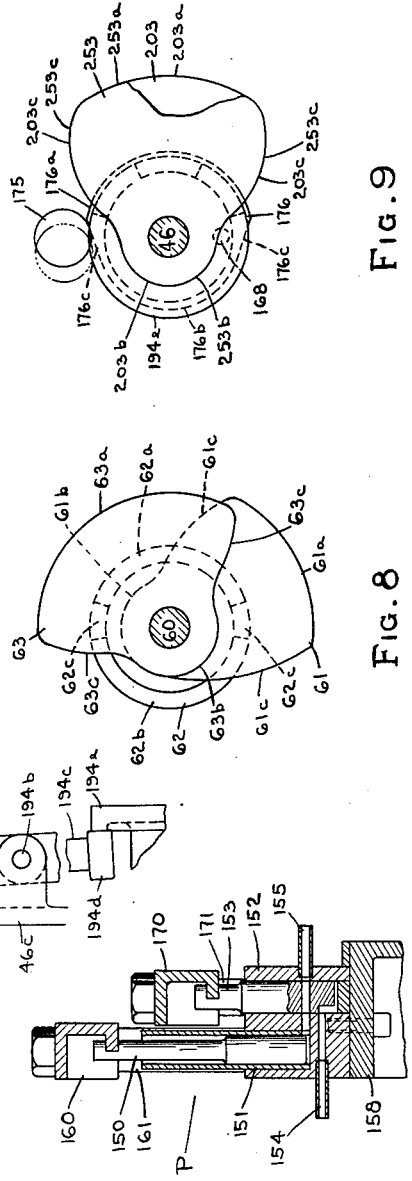

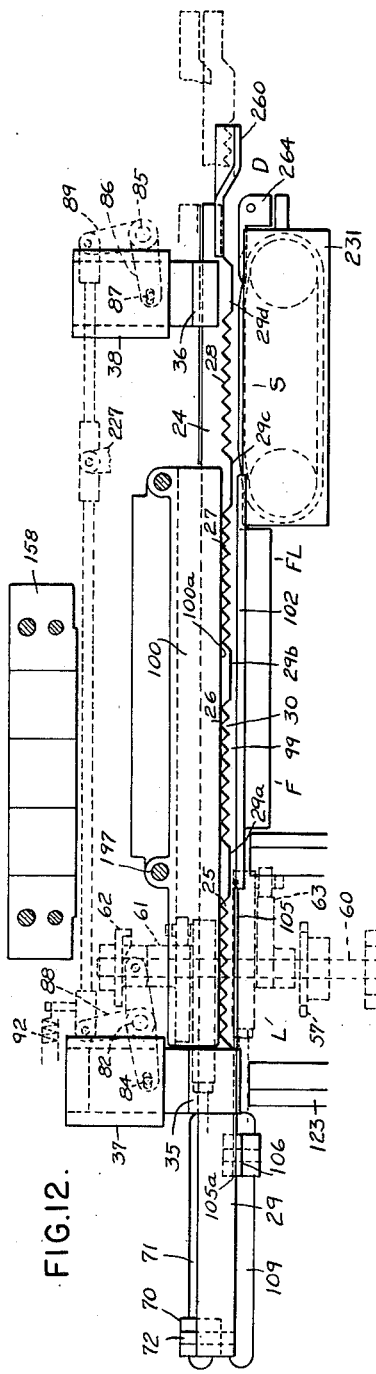
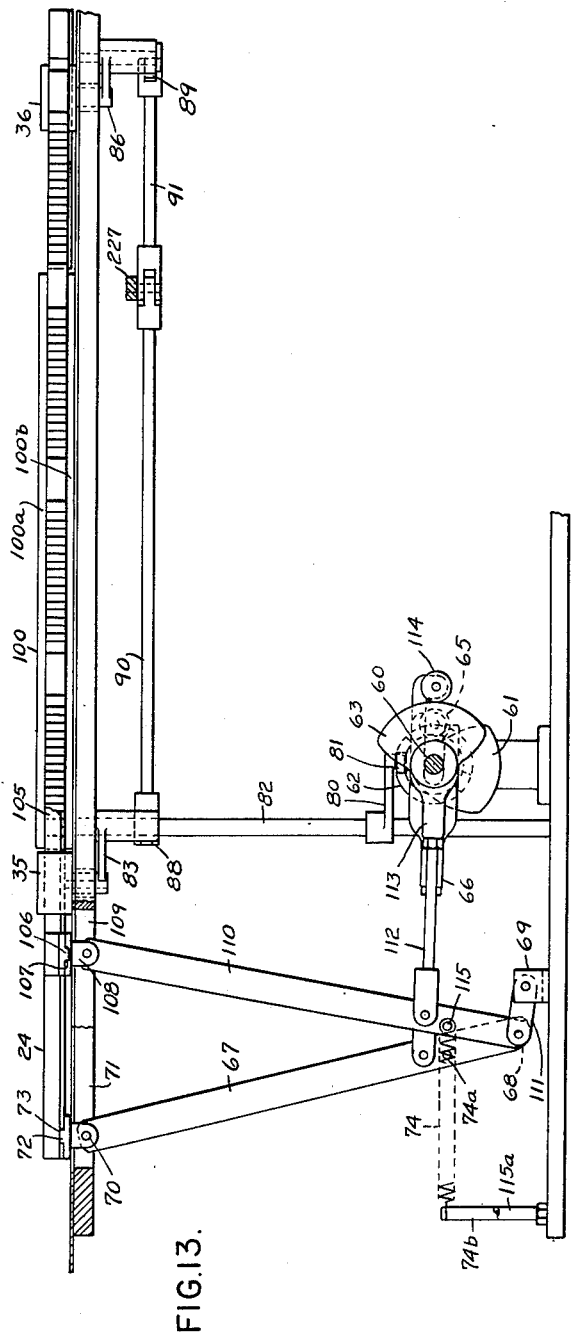
FIG.12.
FIG.13.

United States Patent Office 2,704,147
Patented Mar. 15, 1955

2,704,147

RECTANGULAR-CYCLE GROUP-HANDLING CONVEYOR FOR AMPUL PROCESSING

Frank J. Cozzoli, Plainfield, N. J.

Application May 27, 1952, Serial No. 290,182

3 Claims. (Cl. 198—32)

The present invention relates to the art of filling small containers, such as ampuls, vials, and tubes, with measured quantities of pharmaceutical preparations, and is concerned more particularly with an improved method and means for handling and transporting the containers in group lots from station to station along the processing line. The invention has for a further objective the provision of a practical and efficient method and means of positioning groups of previously sterilized containers, individually untouched by the operator, upon a processing conveyor in upstanding, uniformly spaced relation compatible with the processing operations to be preformed thereafter.

A further aim of the invention is to render available a machine for filling and sealing ampuls and the like, in group lots, and which is so constituted as to be capable not only of effecting the filling and sealing operations at speeds appreciably higher than has been possible of attainment heretofore but of operating in conjunction with existing high production washing, sterilizing, printing labeling and packaging equipment now in use in the larger pharmaceutical houses. To this end the invention undertakes to provide a filling and sealing machine adapted to receive the ampuls in tray lots of a hundred or more, and automatically to feed them in groups to the filler and thence to the sealer for simultaneous processing while the operator is preparing another lot for the machine.

Currently, the ampul manufacturers find it practicable to package the ampuls in gross lots in cartons with the ampuls arranged in nine rows of sixteen each and methods and equipment has been designed to wash and sterilize the ampuls in such box lots. This invention proposes a method and machine for carrying this box-lot-handling system a step further with respect to filling and sealing operations not only to dispense with individual manual handling of the ampuls and to remove possibility of contamination incident to manual handling, but considerably to increase the rate of production over existing methods, in an effort to supply present needs and demands for sterile doses of the various ethical and parenteral preparations.

The invention has for a further objective to provide a conveyor structure for group processing of small containers which operates not only properly to space the containers and to shift them from station to station but which is adapted without extensive change, alteration, or adjustment to accommodate any one of a range of the standard or conventional ampul sizes, for example 1 cc. and 2 cc. ampuls. The invention further undertakes to provide a conveyor structure by which the containers of a group are effectively confined in a row and while so aligned shifted from station to station with a straight line motion.

Still another objective of the invention is to provide a conveyor structure for group lot processing constructed essentially of a single movable part and a single relatively stationary cooperatively arranged part, and in which the movable part of the conveyor is given a rectangular motion whereby it is caused to receive a group of containers, such as ampuls, and shift them to a processing station, release them at that station and return for a second group. As the movable part is moved into position to receive the second group, the previously shifted group is re-engaged and on the succeeding shifting operation, is moved out of the first processing station to another while the second group is moved to the first processing station. The invention thus comprehends a conveyor structure with a motion characteristic adapted to engage, release, and re-engage the ampul groups progressively so that the several groups on the conveyor at any one time are progressively shifted from station to station.

Another objective of the invention is to effect the filling of the containers each with an accurately measured quantity of the preparation and to perform the filling in such manner that the ampul necks remain dry so that the filled ampuls may be properly and effectively sealed.

The invention also aims to provide a combination machine capable of achieving the foregoing needs, which embodies a main power transmission and coordinated branching transmissions with control means in at least one of the branch transmissions for rendering that transmission selectively ineffective while the processing operations actuated by other branch transmissions continue to function.

In carrying out the objectives of this invention it is proposed to construct a processing conveyor by which the containers are supported in aligned groups and shifted single-file from station to station for processing. The processing line preferably is straight and at spaced intervals as stations along the line, the several processing instrumentalities such as loading, filling, flushing, sealing and delivery stations are located. In accordance with this invention, the conveyor comprises movable and relatively stationary elements, the movable element being provided with groups of open-sided recesses along one edge and the stationary element being plane faced and disposed as to form, in effect, a closing side wall for the recesses in the movable part. The movable conveyor part may be a metal or plastic bar so as to be comparatively stiff and rigid and is constructed and mounted for movement rectilinearly and laterally in a predetermined sequence or cycle. In the present embodiment nine recesses are contained in each of the spaced groups of recesses along the bar, the nine unit spacing corresponding to the nine rows in a box lot of ampuls. When the bar is in loading position one ampul of each row is caused to be placed in the respective recesses in the first group of recesses, after which a loading gate closes and the bar is shifted longitudinally. The group of ampuls is thereby carried to a first processing station, which may be a filling station or a gas flushing station, and at this station means may be provided to center the ampuls with the filling needles after which the bar moves laterally and disengages itself from the ampuls. On completion of the disengagement, the bar is given a return movement, and again is shifted laterally into position to receive another group of ampuls. Meanwhile the loading gate opens and the next group of nine ampuls are advanced into the recesses of the bar. In accordance with this invention, the recessed conveyor bar is caused to move in a rectangular path, and on each cycle the bar advances a group of ampuls from one station to another, releases them at the new station and goes back to pick up another group, each group in succession occupying recesses previously occupied by the preceding group along the processing line.

The filling mechanism may comprise preferaby a series of independent measuring units, each having a piston and cylinder element and a valve, and all operatively connected with a common actuator. Means for varying the stroke of the measuring units and for varying the timing of valve actuation, to effect drop elimination, is incorporated as will later be explained. Also a device has been provided associated with the ampul centering mechanism to detect the absence of an ampul at the filling station and to prevent discharge and waste of the preparation when a blank occurs. After filling, or before, if desirable, the ampuls are moved to a flushing station where each may receive a charge of a neutral or inert gas, after which they are passed to a sealing station where stems are heated and sealed. Following the sealing the group is passed to a delivery station where they are displaced from the conveyor.

Loading the machine, in tray lots, is achieved without manual handling of the individual ampuls, with the aid of partitioned trays in which the ampuls stand in defined rows. Such a tray is placed upon the loading platform, in front of a comb-like feeding carriage. The teeth of the comb are arranged to straddle the partitions in the tray and normally urge the ampuls forward so as to position the leading ampul in each row in a related recess in the movable conveyor member each time the loading gate opens. Various controls are provided about the several mechanisms for occasional adjustment to suit specific needs as well as controls for rendering selected mechanisms ineffective, while others continue, as will be explained later.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 of the drawings is a front view of a machine embodying this invention.

Figure 2:
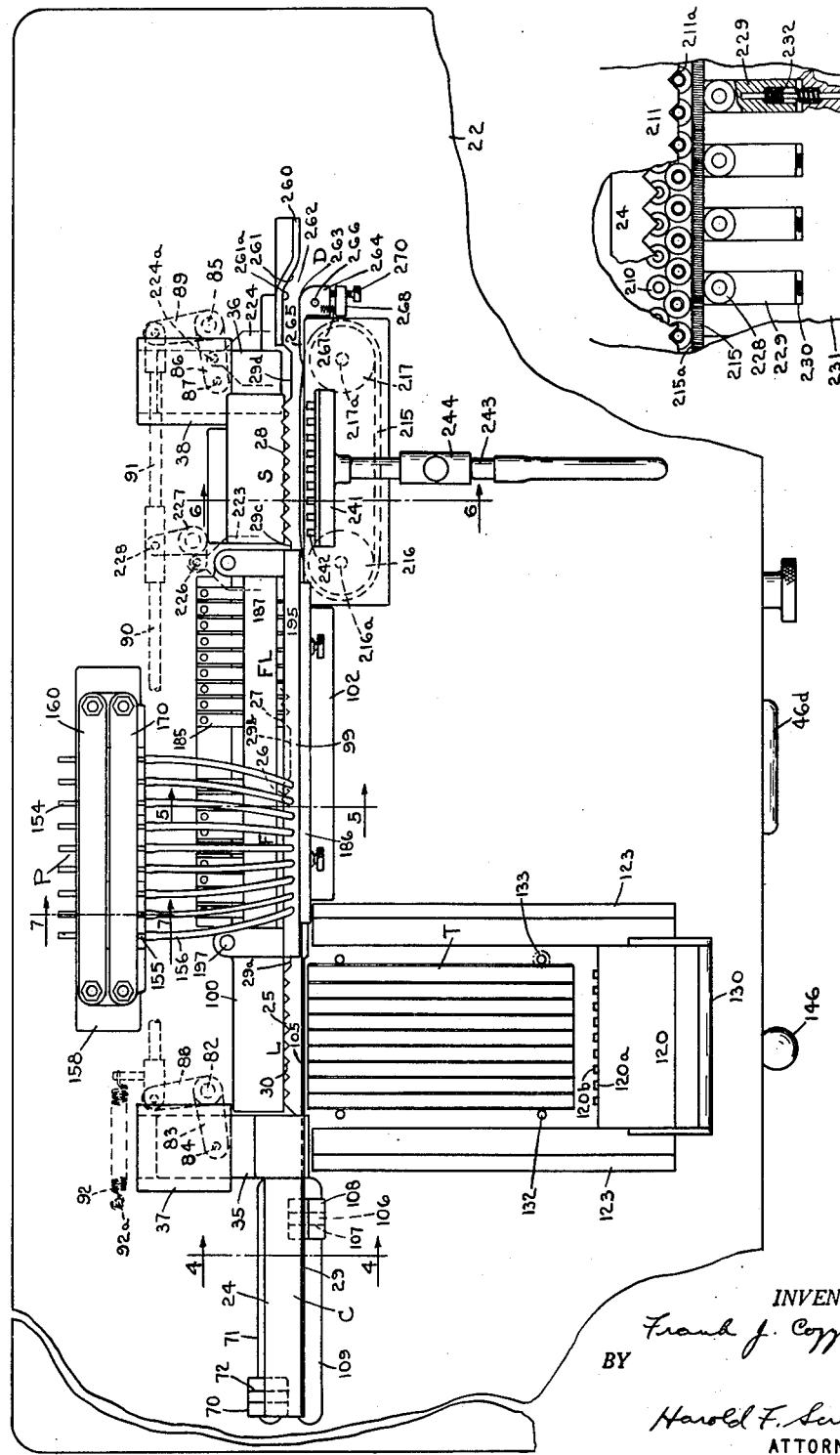
Figure 2 is a plan view of the machine illustrating representative processing apparatus and stations and their relations to the conveyor.

Figures 4, 5 and 6 are sectional views taken substantially along lines 4—4, 5—5 and 6—6 respectively of Figure 2.

Figure 7 is a vertical sectional view of one of the measuring units.

Figures 8 and 9 are end views of cam shafts illustrating typical phase relations of the various actuating cams.

Figure 10 is a plan view of portions of the ampuls rotating mechanism located at the sealing station.

Figure 11 is a view illustrating the rectangular path of the conveyor bar.

Figure 12 is a partial plan view of the machine illustrating more particularly the conveyor bar and its actuating means. Figure 13 is a side view of portions of the mechanism of Fig. 12.

Figure 1:
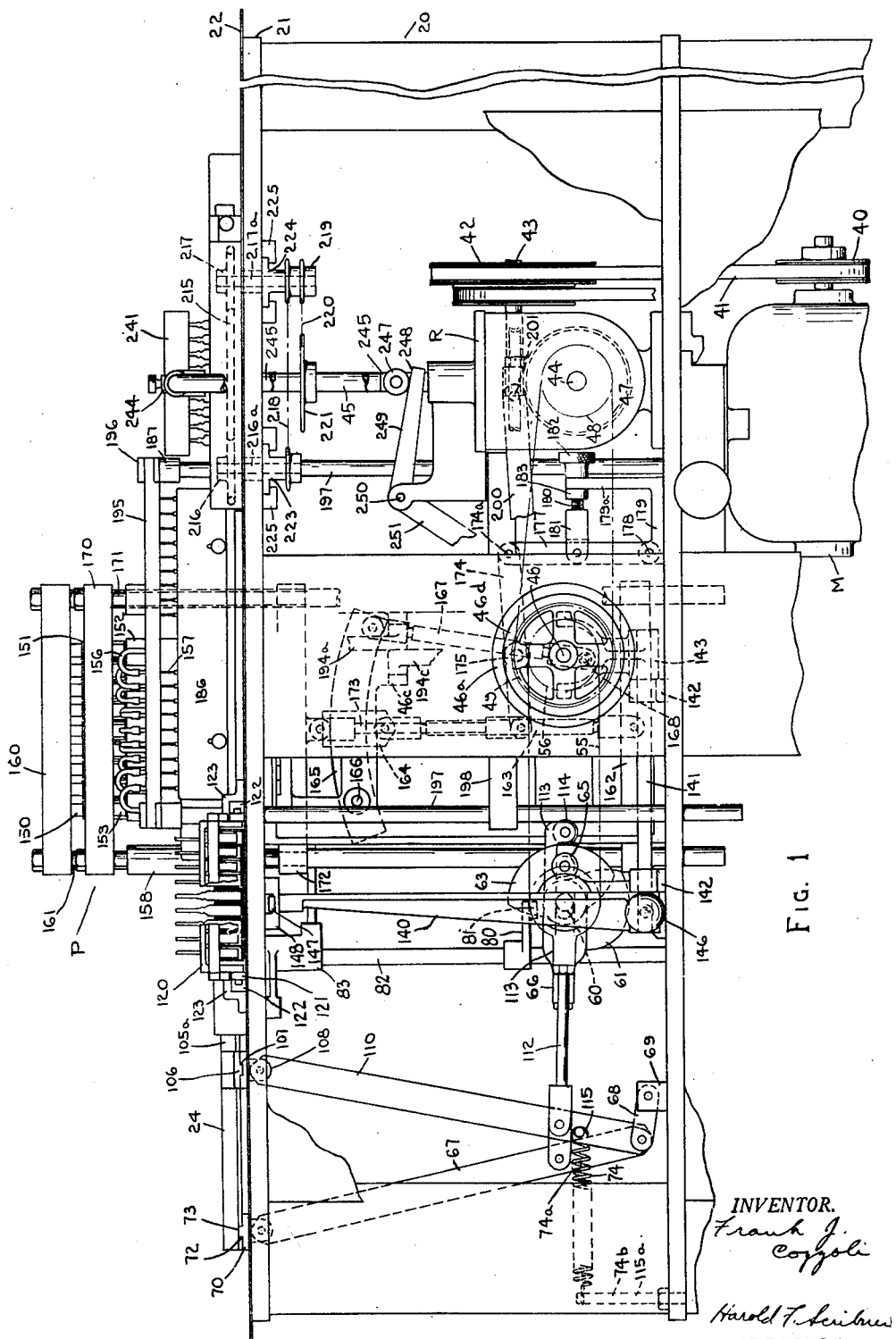
Figure 3:
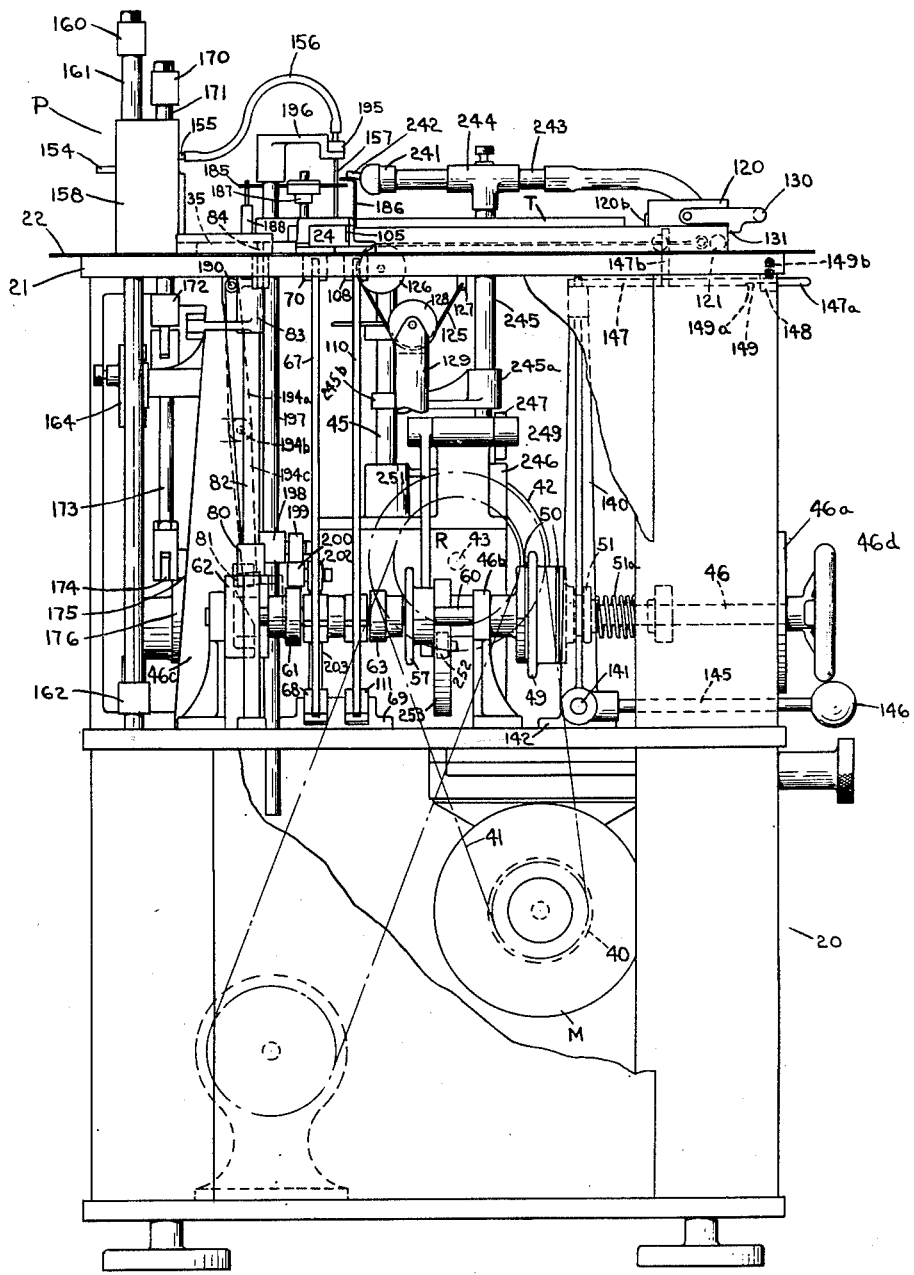
Figure 3 is a side view of the machine, partly in section, more clearly to illustrate portions of the drive.

With reference more particularly to Figures 1 and 3, the machine illustrated comprises a main frame structure 20, that contains the drive mechanisms, and which is provided with a top plate 21 and preferably a non-corrosive surface plate 22. The surface plate 22 is relatively long and narrow and forms a table top of convenient height to provide ample working areas about the processing units. Figure 2 illustrates a typical arrangement in which the letter L indicates the loading station, F the filling station, FL a flushing station, S the closing station, and D the delivery station, all serially located on the top plate 22 so that one may easily follow and observe the progress of the containers through the various processing steps. The container conveyor is indicated generally at C and extends longitudinally of the machine, with the processing stations and apparatus positioned at spaced intervals along the line.

Inasmuch as the handling and processing of glass ampuls present the greatest difficulties, the invention will be explained more especially in connection with a machine equipped for ampul processing, it will be understood that one or more of the processing units or features may be removed or altered or other devices substituted along the conveyor line that are more especially designed for the processing operations on or in connection with specific containers, for example vials that are not sealed but corked.

The processing conveyor C, with which the invention is more particularly concerned comprises, in this instance, an elongated bar 24 which is provided along one edge with a series of equally spaced groups 25, 26, 27, and 28, of opensided ampul receiving recesses 30. The recesses 30 are preferably equally spaced from one another within each group and the spacing consistently uniform in all groups. The leading end of the bar is provided with a blank portion 29, equal, at least, in length to the aggregate length of the recesses in any one group, and with additional blank portions 29a, 29b, 29c, and 29d between the groups. The conveyor bar 24 is constructed and mounted for longitudinal shifting movement and also for movement bodily laterally, these movements by mechanism to be described, are sequentially regulated to produce a rectangular form of operating cycle. To this end the bar 24 is guided for its longitudinal movement in spaced apart bearing brackets 35 and 36, and each bracket in turn, is guided for lateral movement in table mounted guide straps 37 and 38.

Power to actuate the bar is derived in the first instance from a motor M located in the lower part of the machine frame. The motor is adjustably mounted and carries a variable speed sheave pulley 40, which through a belt 41, and a pulley 42, drives a worm shaft 43 of a conventional speed reducing unit R. The speed reducer R is equipped with two out-put shafts 44 and 45, the former being adapted to drive a main cam shaft 46 and the conveyor and the latter being adapted to drive portions of the sealing mechanism S of the exemplified machine disclosed. Power from the unit R is transmitted to the cam shaft 46 through chain and sprocket elements 47, 48, 49, the latter sprocket preferably being constructed with friction clutch faces 50 by which it may be connected and disconnected from the cam shaft 46. A spring tensioned clutch spool 51 keyed to the shaft 46 normally maintains the clutch engaged and in driving relation.

Another chain 55 and sprocket elements 56 and 57, transmits power from the cam shaft 46 to a parallel shaft 60 that is constructed to carry a set of conveyor operating cams 61, 62 and 63. Cam 61 effectuates longitudinal movement of the conveyor bar, cam 62 the lateral movement, and cam 63 operates a conveyor loading gate.

The cam 61 is formed with a high portion 61a, a low portion 61b and intermediate connecting portions 61c of such angular length and throw to effect the requisite motion and timing. A cam follower 65 carried upon a connecting rod yoke piece 66, normally tracks the periphery of the cam and transmits to an oscillatable lever 67, with which it is pivotally connected. The lever 67 is pivoted at its lower end to a motion compensating link 68, which in turn is pivoted to a stationary block or bracket 69. The upper end of lever 67 is pivoted to a keyed slider 70 that extends through a guide slot 71 in the table top and carries a transverse key 72. The underside of the conveyor bar 24 is provided with a key way 73 complemental to the key 72 and receives the latter. In the embodiment illustrated, the cam follower 65 and lever 67 are located on opposite sides of the cam shaft 60 and in this relation the rising side of the cam imparts an advancing movement to the conveyor bar 24. The return movement of the bar is preferably brought about by a pull spring 74 between the lever 67 and a fixed part of the machine, as by spring anchors 74a and 74b.

The train of mechanism provided to effect the lateral or in-and-out movements of the conveyor bar includes the barrel cam 62 on the shaft 60 which is tracked by a cam follower 81 carried at the end of a lever 80. The lever 80 is secured to a vertical rock shaft 82 which carries at its upper end another lever 83. Lever 83 has a pin and slot connection 84 with the supporting guide 35. A similar rock shaft 85, lever 86 and pin and slot connection 87 is provided for actuating the other supporting guide 36, and both rock shafts 82 and 85 are connected to move in unison by means of levers 88 and 89 respectively and rigid connecting links 90 and 91 connected therebetween. Cam 62 is likewise formed with a high portion 62a, a low portion 62b and intermediate connecting portions 62c, constructed and related to impart and oscillatory movement to the shafts 82 and 85 whereby to effect in and out movement of the conveyor bar 24 in timed relation with the advancing and retracting movements imparted by the cam 61.

The linkages just described are arranged preferably to move the conveyor bar outwardly in a positive manner and spring means 92, connected with lever 88 and a fixed anchor 92a, is provided normally to effect the inward movement of the bar. The several directions of movements are so related that the bar 24 is moved in a rectangular path, i. e., in, forward, out, and retract, with dwell periods at the end of the "in" movement and "forward" movement sufficient to perform loading and centering functions later to be explained.

As illustrated more clearly in Figures 2 and 5, the conveyor bar 24 operates within a relatively stationery opensided enclosure 100, the front edges 100a and 100b of which provide upper and lower back-stop guide surfaces for the ampuls. These guides are opposed by a normally stationary guide-fence 102, positioned an ampul clearing distance away, and the two guide elements together define a channel 99 in which the ampuls may stand for a processing function and in which they are shifted from one station to another.

At the loading station there is provided a reciprocable fence or gate element 105, which is mounted for movement in-and-out with the conveyor bar 24, and also longitudinally along the bar, across the first group 25 of recesses therein, independently of the longitudinal movement of the bar. To these ends the gate 105 is constructed to be guided within the bearing block 35, along side the bar 24 (see Figure 4), and is provided at its outer end 105a with a key 106 that is received in a keyway 107 formed in a slider block 108. The slider 108 extends through a guide slot 109 in the table top and has the free end of a lever 110 pivoted thereto. The lower end of lever 110 is pivoted to a link 111 which in turn is pivoted to the fixed block or bracket 69. The lever 110 is caused to be actuated by a gate cam 63 and to that end is connected, as by connecting rod 112, a yoke piece 113, and cam follower 114, to respond to the action of the cam 63. Cam 63 is, as with the other cams, provided with a high portion 63a, a low portion 63b and intermediate connecting portions 63c, of a length and throw to produce the herein explained movements of the gate. A pull-spring 115 connected to the lever 110 and to a stationary spring anchor 115a is provided to move the gate to its 'open" position. A typical operating cycle of the conveyor bar and gate is as follows:

Assume that the conveyor 24 is in its "retracted in" position and the gate 105 "open." In this position the opensided recesses 30 are exposed and receive an ampul in each. Thereafter the gate 'closes" by being moved forward by the cam 63, the leading edge of the gate passing between the ampuls in the recesses and those next following in each row. To facilitate gate closing the leading edge of the gate may be sharpened or beveled. After the gate is in "closed" position, the conveyor bar 24 is shifted "forward" with a straight line movement and carries the ampuls contained in the recesses 30 to the first processing station here represented as a filling station F. In traversing this distance the ampuls are confined in the recesses, by the inner face of the gate and thereafter by the inner face of the wall 102. After a dwell period at station F, the conveyor bar 24 is moved laterally outwardly and disengages itself from the ampuls at station F. The 'out" movement of the bar is made great enough to position the apexes of the recesses behind the guide edges 100a and 100b of the stationary guide 100, and upon reaching such fully disengaged position, the bar is given a "retracting" movement. As the bar moves "out" and away from the ampuls, the gate member 105 may move "out" with it and likewise the amplus in the tray at the loading station so that the latter are brought against the back-stop edges 100a and 100b of the guide 100. After the gate is fully "opened" the conveyor bar is caused to move "in" and the first group of recesses 25 engages with the ampuls standing at the loading station, and the second group of recesses 26 engages with the ampuls standing at station F. After engagement and proper spacing of the ampuls is complete, the gate 105 is caused to close, thereafter the bar again advances longitudinally, and the first and the second group of ampuls are simultaneously shifted one station. They are then released by virtue of the out movement of the bar, and as the rectangular movement cyclically continues, the respective groups of ampuls are shifted from station to station with a straight line movement, never being displaced from the channel or from the processing line.

The cooperating automatic ampul loading mechanism of this invention comprises one or more longitudinally partitioned trays T. Each of the trays is relatively shallow but it and its partitions are deep enough to maintain the ampuls properly aligned in their respective rows, in this instance nine rows are provided. The ampul advancing mechanism may comprise a movable carriage 120 which is equipped with rollers 121 that are guided in run-ways 122 formed by straps 123 and the table top. The carriage 120 bridges the tray T and is formed with a series of depending pushers 120a that project into the respective slots in the partitioned tray so that its forward face 120b engages the body part of the ampul sufficiently low to prevent tipping of the ampul as it is being pushed. At each side of the carriage 120 a cable wire 125 is attached. These cables extend forward and pass over pulleys 126 journaled in the machine frame. The ends of the cables are secured to lugs 127 at the underside of the table and within the cable loop between the lugs 127 and the fixed pulleys 126, each cable carries a free pulley 128 and its attached weight 129. The tendency of the weight 129 therefore is normally to urge the loading carriage continuously with a constant pressure sufficient to move the ampuls but insufficient, of course, to crush or damage them when their advance is stopped by the conveyor bar 24 or the gate 105. As illustrated in Fig. 3, the loading carriage may be equipped with a resetting handle 130 by which it may be manually retracted for reloading purposes or for any other purpose. The handle 130 is pivoted to the carriage and is preferably provided with a latch finger 131 operative to latch on the ends of the guides 123 to retain the carriage in retracted position.

Tray locating means, here illustrated as pins or buttons 132 are provided between the runways 123 of the loading carriage for assisting in locating tht tray and registering the rows with the positions of the ampul recesses in the conveyor bar 24. The tray exemplified in the drawings is adapted to contan one gross of 2 cc. ampuls in upstanding position. Trays for 1 cc. ampuls may be the same size or more conveniently, slightly smaller, and if smaller, spacer rings indicated at 133 may be dropped over the buttons 132 or larger buttons may be provided.

As illustrated more clearly in Figs. 2 and 3, means may be provided to disengage the drive to the processing conveyor for the interval required to change trays at the loading station. A preferred form of means to effect the disengagement automatically comprises a lever 140 which is securely mounted on a clutch fork shaft 141. The shaft 141 is rotatable in bearings 142 provided by a shelf of the machine, and carries a clutch shifter fork 143. The lever 140 may be equipped with an extension 145 that projects to the front of the machine and carry an operating knob 146. Lever 140 extends upwardly and loosely carries one end of a latch bar 147. The bar 147 extends forwardly and overlies a strap 148 secured to the underside of the plate 21. The underside of the bar is notched as at 149 to provide a shoulder 149a. When the latch bar is "forward" the shoulder 149a latches on the strap 149 and may be released, therefore, only when the operator lifts the end 147a. A spring detent means 149b normally constrains the bar in latched position, but yields when the bar is lifted and slid longitudinally. The latch bar 147 also carries a pin 147b that projects through a slot in the table top into the path of movement of the loading carriage 120. As the operator pulls the carriage to its retracted position for changing trays, the latch bar pin 147b is engaged and shifts the bar 147 to its latched position. The movement actuates lever 140 which, in turn, rocks shaft 141 and clutch fork 143 and the drive clutch is opened against the pressure of its spring 51a. Thus the processing conveyor drive is suspended whenever the loading carriage is withdrawn to its latched position. To stop the conveyor at any other time, at will, the handle 146 is depressed, and this movement through the connections provided by rock shaft 141 and clutch shifter fork 143 similarly opens the drive clutch 51 and the drive is suspended and remains suspended as long as the latch bar 147 remains latched to the strap 148.

As illustrated, most clearly in Figure 3, the drive sprocket 49 is loose on the cam shaft 46, and the latter is journaled in bearings 46a, 46b, and 46c provided by the main framing of the machine. Whenever the clutch 50, 51 is engaged, the shaft 46 is power rotated. The cam shaft may also be turned over by hand by means of a handwheel 46d positioned at the front of the machine.

The filling, flushing and sealing mechanisms for a machine of this character may take a variety of forms. A preferred form of filling mechanism is disclosed more particularly in Figs. 1, 3 and 7, which comprises essentially a measuring unit P for each ampul of the group to be filled, and a variable stroke means for actuating the unit. In the form disclosed herein, each measuring unit comprises a piston and cylinder member 150 and 151, cooperatingly arranged in a body member 152, and a valve member 153 also mounted in the body. The body member 152 is provided with an intake nipple 154 and a delivery nipple 155 that is connected by flexible tubing 156 to a filling needle 157. The unit body 152, and valve piston 153, are ported so that fluid is caused to enter and be discharged from the measuring cylinder on alternate strokes of the piston 150. In the present disclosure nine such units are required, and for convenience may be grouped in units of three in a common body part that may be detachably secured to a supporting column 158. Each of the pistons of the several measuring units removably connects with a cross-head 160 to which guide bars 161 are secured. The bars 161 extend downwardly through the table and carry a second cross head 162. The lower crosshead 162 is connected by a connecting rod 163 with a sector arm yoke piece 164 that is normally clamped to, but is radially adjustable on, an oscillatable sector-arm 165. The sector arm 165 is pivoted at one end to the main framing as at 166 and its free end is connected by connecting rod 167 with a fixed throw crank member 168. The crank member 168 is secured to and rotated with the cam shaft 46. Turning of the cam shaft 46 thus effects oscillation of the sector arm 165, and effects reciprocation of the pistons 150 in their cylinders 151, the extent of reciprocation and thereby the quantity delivered by the respective units, being predetermined by the position the yoke piece 164 occupied on the arm 165. If the yoke piece 164 is clamped near the fixed pivot 166 of the arm, the stroke imparted to the pistons will be small and the delivery to the filling needles will be small, whereas if the yoke piece is adjusted outwardly on the arm the stroke and the delivery will be proportionately increased.

The nine valve pistons 153 are caused to shift from one extreme position to the other in time with the piston movements whereby pumping action is obtained. For this purpose each valve piston 153 removably connects with a crosshead 170 that is guided vertically by rods 171. Rods 171 carry a second crosshead 172 at the underside of the table 21—22. In this embodiment, the lower crosshead 172 is connected by a link 173 to a shiftable lever 174, and the latter carries a follower 175 positioned to track the periphery of a valve cam 176. The lever 174 is pivoted at its end 174a to an upstanding link 177 that pivots at 178 on a fixed bracket 179. The bracket 179 is formed with an extension 179a that journals a threaded adjusting shaft 180. Shaft 180 threads into an eye piece 181 that pivotally connects with the upstanding link 177. A hand knob 182, and a collar 183, fixed to the screw shaft at opposite sides of the bracket 179a serves as a convenient means for adjusting the link 177 and for locking it in adjusted position. As illustrated by Figures 1 and 9, an adjustment of the link 177 effects a shifting of lever 174 and the follower 175 thereof laterally relative to the dead center position of the valve cam 176 and crankpin 168. The valve cam is provided with a high portion 176a, a low portion 176b and intermediate connecting portions 176c so related with the crank pin 168 that the valve is caused to be shifted from one position to the other normally in time with the change in piston stroke. However, if the cam follower 175 is adjusted laterally a few degrees from dead center in the direction of turn of the valve cam, the ascending portion 176c of the cam will be "late" in actuating the follower, so that the valve 153 is "late" in shifting from "discharge" to "intake," and during the initial portion of the pump intake stroke, fluid is drawn back from the needle. Thus, any droplet that tends to adhere to the needle at the end of the normal delivery stroke, is, by properly adjusting the position of the follower 175, drawn within the needle. Immediately thereafter, the valve 153 is shifted, by the cam 176, to intake position and the intake cycle continues drawing fluid from the supply 154.

Before the filling cycle is instituted the ampuls will have been brought by the processing conveyor to the filling station and their open ends brought into concentric relation with the needle 157. In this embodiment the ampul centering mechanism includes a slidable V-plate 185 associated with each ampul position, and a common back stop plate 186. The series of V-plates are supported and guided in a vertically adjustable support 187, and in-and-out movements imparted to each by means of individual pivoted levers 188. Each of the levers 188 has a reduced extension 188a that passes through a clearance hole in the respective V-plates. The levers are pivoted as at 189 and extend below the table in position to be oscillated in one direction by a common actuator bar 190. A compression spring 191 (see Fig. 5) operatively related with each lever 188 exerts a force thereon tending normally to urge the V-plate forwardly against the ampul aligned therewith.

If a blank occurs in the line of ampuls, the associated V-plate will over-run its normal stopping point and this over-running feature is utilized to latch the measuring unit valves in their fluid intake positions so that the entrained fluid will be discharged back into the source of supply. For this purpose each of the ampul centering levers 188 at the filling station is constructed to operate a latch slide 192 which is movable in and out of the path of movement of the lower crosshead 172 of the valves. The slides 192 are supported and guided in the framing 46c, and the inner ends 192b are positioned to lie just below the plane of the underside of a ledge 172a on the valve crosshead 172, when the latter is in its "up" position, which corresponds with the valve intake position. While the ampuls are moving into the filling station and being centered, the piston of the measuring unit is on its intake stroke and the valve is "up" in intake position, so that if a blank occurs in the line, the particular V-plate associated with that receptacle will overrun and place the end 192b of latch bar 192 under the ledge 172a of the crosshead 172. When this happens the valves are locked "up" and no filling occurs on that cycle.

The centering slide actuating bar 190 is carried at the upper end of an oscillatable lever 194a which is pivotally supported as at 194b to a portion of the framing 46c. A lower extension 194c of lever 194a carries a follower roller 194d positioned to track upon a barrel cam 194e that is secured to the cam shaft 46. The cam 194e is formed with high, low and dwell portions constructed and timed to oscillate lever 194c, 194a and the slide actuating bar 190 so that the individual centering slides 185 are retracted prior to the start of the longitudinal shift of the conveyor bar in indexing the ampul groups into and out of filling relation with the filling needles.

At the completion of the ampul centering operation the filling needles 157 are caused to decend and telescope the open ends of the ampuls. As illustrated more clearly in Figures 1, 2, 3, and 5, the filling needles are carried by a bar 195 removably secured to the outer ends of a pair of arms 196. Arms 196 are carried at the upper ends of guide rods 197 that extend through the top plate and carry a crosshead 198. The crosshead carries a cam follower 199 positioned to track the upper side of a pivoted lever 200. Lever 200 is fixedly pivoted as at 201 to the framing of the machine, in this instance the reduction housing R, and carries a cam follower 202, that tracks a needle cam 203. The needle cam 203 is provided with a high portion 203a, a low portion 203b, and intermediate connecting portions 203c, proportioned to effect the lifting, lowering, and dwell functions of the filling needles in time with the indexing and filling cycles.

After filling the ampuls are moved by the cyclic action of the processing conveyor to the flushing station and receive a flushing of a neutral gas. At this station a second bank of centering V-plates is provided, and also a second bank of needles for injecting the flushing gas. As the structure and operation of the centering plates corresponds to that explained for the centering plates at filling needles, further explanation is believed necessary. Likewise, the flushing needles are similar to the filling needles except that they are connected to a gas supply line, which may be separately valved, instead of to measuring units. Also, at the flushing station, blank detecting means is unnecessary and latch bars such as 192 located at the filling station may be omitted.

After flushing, the bank of ampuls are moved to a sealing station S where they are individually rotated and sealed. A preferred form of rotating means comprises a series of fixed rollers 210 positioned along the processing line opposite the stopping points of the bank of ampuls at the sealing station. The rollers 210 are normally overlaid by the bar 24, but as the bar 24 recedes, or moves out, the ampuls at this station are caused to be displaced and move "out" with the bar until their lower portions engage in the notches formed by the peripheries of the rollers of the series of rollers 210. The stem ends of the ampuls are simultaneously caused to enter corresponding notches 211a formed in a normally stationary but vertically adjustable V-plate 211 located just below their open ends. The ampuls are thus supported in V's at both their upper and lower ends, and since the uniform spacing previously established by the conveyor bar 24 is still maintained, the respective ampuls may be individually rotated without dragging upon each other.

Ampul rotating is brought about, in this embodiment, by an endless belt 215 that tracks grooves formed in pulleys 216 and 217, each pulley being secured to drive shafts that extend below the table top and which are connected by sprocket and chain connections 218. The shaft of belt pulley 217 extends further and carries a sprocket 219 that may be chain driven, as at 220, from a reduction shaft sprocket 221 on reduction shaft 45 previously mentioned.

Each of the pulley shafts 216a and 217a are journaled in bearings provided in laterally movable slides 223 and 224 that are guided in slide ways formed by straps 225. The rear end of the slide 223 has a pin and slot connection 226 with a pivoted bell crank lever 227 whose other arm forms a junction 228 with the links 90 and 91. The rear end of the slide 224 has a pin and slot connection 224a with the oscillatable lever 86. By these connections the ampul rotating belt assembly 215 is caused to move in and out with the in and out movements of the conveyor bar 24, though bar 24 normally moves slightly further. The ampul engaging run 215a of the belt 215 is yieldingly urged outwardly beyond its normal pitch line by independent spring loaded rollers 228. Each roller 228 is journaled on a slide block 229 fitted in a slot 230 in a movable base plate 231. Compression springs 232 acting at the rear of each of the blocks urges the blocks outwardly whereby the drive belt is yieldingly urged against the sides of the ampuls.

While the ampuls are rotated their tops are hermitically sealed. A prefered burner construction comprises a manifold or burner head 241 constructed to carry a plurality of burner tips 242, spaced apart preferably in accordance with the ampul spacing, and a fuel supply pipe 243. The supply pipe 243 is mounted in a bracket 244 for adjustment axially whereby the position of the flames relative to the displaced ampuls may be adjusted to suit conditions. The supporting bracket, in turn, is mounted upon a vertically movable shaft 245 that is guided in guide bushings installed in the table top and in a bracket 246 supported on the reduction unit R. The shaft 245 carries a roller 247 that is adapted to be engaged by one arm 248 of an actuating lever 249. Lever 249 is mounted on a rock shaft 250 journaled in an extension of the support 246 and a second arm 251 also carried by the rock shaft supports a cam follower 252 positioned to track the periphery of a burner elevating cam 253. Cam 253 is carried by the cam shaft 46 and is rotated in phase with the other cams. And as with the others, the burner elevating cam is formed with a high portion 253a, a low portion 253b, and intermediate connecting portions 253c, proportioned and related to elevate the burners out of the path of travel of the ampuls during index movements thereof and to lower the burner fires to their sealing position after the ampuls arrive at the sealing station and are being rotated. A guide arm 245a may be secured to the vertical shaft 245 and have its outer end 245b bifurcated to straddle the reduction shaft 45 thereby to prevent angular movement of the shaft 245 and burner head carried thereby.

As above indicated, when the sealing operation has been completed the burners are elevated, the ampuls are moved back into the channel 99 as an incident to the next "in" movement of the conveyor bar, and the ampul rotating assembly recedes. On the following forward movement of the conveyor bar, the sealed ampuls confined in the recesses thereof are advanced in line, toward the delivery station D where they are removed from the conveyor.

The removal operation is effected in the instant disclosure, by the provision of a stripper member 260 positioned in the path of ampul travel. The stripper 260 is generally L-shaped having a vertically disposed, bifurcated wall portion 261 positioned preferably at an angle to the line of travel of the ampuls. The conveyor bar 24 passes through the bifurcation in the stripper, and brings the ampuls successively against the inclined wall 261 and the latter, which in co-operation with the forward motion of the ampuls, cams the ampuls out of their respective recesses in the bar 24. The sealed ampuls are thus caused to enter and pass through the throat region 262 of the delivery channel and intermingle with those previously delivered that may be standing at the delivery station.

As shown by Figure 2, the delivery channel 262 may be formed by the wall portion 261 of the stripper and the side 263 of a yieldable trigger 264. The trigger 264 is formed with an extension 265 that forms, in effect, a continuation of the guide fence 102 so that as the ampuls are moved past the straight run of the ampul rotating belt 215 they enter the channel formed between the bifurcated portion 261a of the stripper and the extension 265. The trigger 264 pivots on a fixed pivot 266 and contains a compression spring 267 that reacts against a fixed abutment 268 to yieldingly urge the leading portion of the extension 265 against the ampuls. Hence at the end of their shifting movement the last ampul standing in the channel is clamped against backward tipping. Preferably the leading end of the trigger 265 is beveled or rounded to facilitate entrance of the ampuls into the delivery channel. The range of swing of the trigger may be controlled and limited by an adjustable stop screw 270 carried by the block 268. Preferably, the ejected ampuls are permitted to stand and accumulate at the delivery station to permit cooling of their sealed ends sufficiently to permit further handling or processing. If desired, the conveyor bar 24 and the guide fence may be extended one or more indexing groups or stations whereby to provide a cooling off period before the ampuls arrive at the delivery station.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a machine of the character described a conveyor structure operative to transport ampuls to be filled from a loading station to a filling station in groups of two or more comprising a rectilinearly and laterally shiftable bar member, said bar having a series of equally spaced groups of equally spaced ampul receiving recesses in one side thereof adapted to receive ampuls in upstanding spaced position, means comprising in part a stationary guide member positioned opposite the recesses so as to form a closure to the open-sides thereof to contain the ampuls and along which the ampuls are caused to travel and in part a movable gate member at the loading station, means connected with the bar member for imparting movement thereto in a rectangular path, means connected with said gate member for imparting movement thereto alternately from gate opened position to gate closed position, means at the loading station operative when the said gate is in open position to position ampuls to be filled in a group of recesses in the bar, said bar actuating means and said gate actuating means being relatively timed and actuated to effect a closing of the gate member after a charge of ampuls has been received in the group of recesses in the bar at the loading station and thereafter longitudinal movement of the bar whereby the contained ampuls are moved in a group to the filling station and left at said station incident to a succeeding lateral and a return movement of the bar to the loading position, said gate member being actuated to open position prior to the completion of the cycle.

2. In a machine for processing containers, the combination of conveyor means for transporting the containers in groups from a loading station to and through one or more processing stations, in which the conveyor means includes a bar member having groups of open-sided container receiving recesses formed therein, the groups being uniformly spaced from each other and recesses within groups being uniformly spaced, actuating means for the bar operative to move the bar intermittently sequentially rectilinearly and laterally in a rectangular path whereby containers to be processed are passed in a group from the loading station to the first processing station and the group at the first processing station passed to a second processing station on each rectangular cycle of the conveyor bar, said actuating means for the bar including guide means for confining the bar to a linear path of movement and means mounting said guide means for bodily movement laterally, and cam means and connections with the bar and guide means respectively for actuating the bar linearly and the guide means laterally in sequence, group loading means at the loading station for positioning a group of containers simultaneously in the opensided recesses of the bar during a dwell period in the rectangular cycle of movement of the bar, and means to displace the groups of containers successively from the recesses in the bar following the conclusion of the processing operation.

3. The combination of claim 2 in which the group loading means includes a tray member adapted to contain a bulk supply of containers, said tray being open-ended and having spaced partitions extending lengthwise the tray for defining the containers in rows, and means interfitting the said spaced partitions of the tray operative successively to urge the leading container of each row into an associated recess in the conveyor bar on each operating cycle of the latter.

References Cited in the file of this patent

UNITED STATES PATENTS

| | | |
|---|---|---|
| 1,575,723 | Smith | Mar. 9, 1926 |
| 1,925,502 | Schaefer | Sept. 5, 1933 |
| 2,011,839 | Anderson | Aug. 20, 1935 |
| 2,357,799 | Almgren | Sept. 12, 1944 |
| 2,526,983 | Wait | Oct. 24, 1950 |

FOREIGN PATENTS

| | | |
|---|---|---|
| 360,662 | Great Britain | Nov. 12, 1931 |